(12) United States Patent
Patkar et al.

(10) Patent No.: US 9,334,342 B2
(45) Date of Patent: May 10, 2016

(54) POLYPROPYLENE FOR REDUCED PLATE OUT IN POLYMER ARTICLE PRODUCTION PROCESSES

(75) Inventors: Mahesh Patkar, Houston, TX (US); Michael Musgrave, Houston, TX (US); Jerome Thierry-Mieg, Houston, TX (US); Luyi Sun, Pearland, TX (US); Likuo Sun, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 1260 days.

(21) Appl. No.: 12/243,275

(22) Filed: Oct. 1, 2008

(65) Prior Publication Data

US 2010/0081743 A1 Apr. 1, 2010

(51) Int. Cl.
| | |
|---|---|
| *B29C 71/00* | (2006.01) |
| *C08F 10/06* | (2006.01) |
| *B29C 71/02* | (2006.01) |
| *C08F 110/06* | (2006.01) |
| *C08F 210/06* | (2006.01) |

(52) U.S. Cl.
CPC ............... *C08F 10/06* (2013.01); *B29C 71/00* (2013.01); *B29C 71/0063* (2013.01); *B29C 71/0072* (2013.01); *B29C 71/02* (2013.01); *B29C 2071/022* (2013.01); *C08F 110/06* (2013.01); *C08F 210/06* (2013.01)

(58) Field of Classification Search
CPC .... B29C 71/0063; B29C 71/00; B29C 71/02; B29C 71/0072; B29C 2071/022
USPC .......................................................... 524/570
See application file for complete search history.

(56) References Cited

U.S. PATENT DOCUMENTS

| | | | |
|---|---|---|---|
| 4,251,407 A * | 2/1981 | Schroeder et al. ............ 524/584 |
| 4,271,060 A | 6/1981 | Hubby | |
| 4,543,399 A | 9/1985 | Jenkins, III et al. | |
| 4,588,790 A | 5/1986 | Jenkins, III et al. | |
| 5,001,205 A | 3/1991 | Hoel | |
| 5,026,798 A | 6/1991 | Canich | |
| 5,028,670 A | 7/1991 | Chinh et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,643,847 A | 7/1997 | Walzer, Jr. | |
| 5,665,818 A | 9/1997 | Tilston et al. | |
| 5,668,228 A | 9/1997 | Chinh et al. | |
| 5,677,375 A | 10/1997 | Rifi et al. | |
| 5,703,187 A | 12/1997 | Timmers | |
| 5,747,406 A | 5/1998 | Reichle et al. | |
| 5,849,852 A | 12/1998 | Koch et al. | |
| 5,859,653 A | 1/1999 | Aoki et al. | |
| 5,869,723 A | 2/1999 | Hinokuma et al. | |
| 6,037,417 A * | 3/2000 | Nguyen et al. ................ 525/240 |
| 6,069,213 A | 5/2000 | Nemzek et al. | |
| 6,147,173 A | 11/2000 | Holtcamp | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,420,580 B1 | 7/2002 | Holtcamp et al. | |
| 7,445,827 B2 * | 11/2008 | Le et al. ....................... 428/35.7 |
| 2004/0054056 A1 | 3/2004 | Barber | |
| 2006/0247332 A1 | 11/2006 | Coffey | |
| 2007/0040292 A1 | 2/2007 | Ashbaugh | |
| 2007/0202285 A1 * | 8/2007 | Burmaster et al. ........... 428/35.7 |
| 2007/0210480 A1 * | 9/2007 | Funaki et al. ................ 264/176.1 |
| 2008/0213519 A1 | 9/2008 | Matsuura | |

FOREIGN PATENT DOCUMENTS

WO 9832775 A1 7/1998

OTHER PUBLICATIONS

Product News release by www.borealis.com on RB206MO-06 in Sep. 2008.*
"Clarified Random Copolymer for Injection Molding," Polypropylene 6823MZ, Total Petrochemicals USA, Inc., 1 pg.*
Eugene You-Xian Chen, et al., "Cocatalysts for Metal-Catalyzed Olefin Polymerization: Activators, Activation Processes, and Structure-Activity Relationships", Chem. Rev., 2000, 100 (4), pp. 1391-1434.
Gregory G. Hlatky, "Single-Site Catalysts for Olefin Polymerization: Annual Review for 1997", Coordination Chemistry Reviews, 2000, 199, pp. 235-329.

* cited by examiner

*Primary Examiner* — Peter D Mulcahy
(74) *Attorney, Agent, or Firm* — Albert Shung

(57) ABSTRACT

Polymer articles and processes of forming polymer articles are described herein. The processes generally include providing a propylene based polymer formed from a metallocene catalyst and melt processing the propylene based polymer to form a polymer article.

17 Claims, No Drawings

POLYPROPYLENE FOR REDUCED PLATE OUT IN POLYMER ARTICLE PRODUCTION PROCESSES

FIELD

Embodiments of the present invention generally relate to propylene polymers. Specifically, embodiments of the present invention relate to propylene polymers that reduce the occurrence of plate-out on molded plastic parts.

BACKGROUND

"Plate-out" is an objectionable coating that may gradually form on surfaces, such as metal surfaces, of molds during processing of plastics. This coating can cause haziness and cloudiness in the molded plastic parts. The problem of plate-out can be exacerbated due to migration of additives to the polymer/metal interface during processing. Bloom, also known as migration, can result in cloudiness of the molded plastic part.

Therefore, a need exists for polymers and/or processes that minimize plate-out or bloom in molded plastic parts.

SUMMARY

Embodiments of the present invention include polymer articles and processes of forming polymer articles. In one or more embodiments, the processes generally include providing a propylene based polymer formed from a metallocene catalyst, melt processing the propylene based polymer to form a polymer article, wherein the process is capable of operation for at least about 30 hours at a barrel temperature of at least 420° F. and a hot runner temperature of 480° F. without experiencing plate-out.

In another embodiment, the processes include providing a propylene based random polymer formed from a metallocene catalyst, wherein the propylene based random copolymer includes from about 0.5 wt. % ethylene and exhibits a melt flow rate of from about 15 dg/min. to about 100 dg/min., melt processing the propylene based polymer to form a polymer article and heat treating the polymer article, wherein the polymer article exhibits a reduction in haze upon heat treatment.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. A brief discussion of such catalyst systems is included below, but is in no way intended to limit the scope of the invention to such catalysts.

Metallocene catalysts may be characterized generally as coordination compounds incorporating one or more cyclopentadienyl (Cp) groups (which may be substituted or unsubstituted, each substitution being the same or different) coordinated with a transition metal.

The substituent groups on Cp may be linear, branched or cyclic hydrocarbyl radicals, for example. The inclusion of cyclic hydrocarbyl radicals may transform the Cp into other contiguous ring structures, such as indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

A specific, non-limiting, example of a metallocene catalyst is a bulky ligand metallocene compound generally represented by the formula:

wherein L is a bulky ligand, A is a leaving group, M is a transition metal and m and n are such that the total ligand valency corresponds to the transition metal valency. For example m may be from 1 to 4 and n may be from 0 to 3.

The metal atom "M" of the metallocene catalyst compound, as described throughout the specification and claims, may be selected from Groups 3 through 12 atoms and lanthanide Group atoms, or from Groups 3 through 10 atoms or from Sc, Ti, Zr, Hf, V, Nb, Ta, Mn, Re, Fe, Ru, Os, Co, Rh, Ir and Ni. The oxidation state of the metal atom "M" may range from 0 to +7 or is +1, +2, +3, +4 or +5, for example.

The bulky ligand generally includes a cyclopentadienyl group (Cp) or a derivative thereof. The Cp ligand(s) form at least one chemical bond with the metal atom M to form the "metallocene catalyst." The Cp ligands are distinct from the leaving groups bound to the catalyst compound in that they are not as highly susceptible to substitution/abstraction reactions as the leaving groups.

Cp ligands may include ring(s) or ring system(s) including atoms selected from group 13 to 16 atoms, such as carbon, nitrogen, oxygen, silicon, sulfur, phosphorous, germanium, boron, aluminum and combinations thereof, wherein carbon makes up at least 50% of the ring members. Non-limiting examples of the ring or ring systems include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5, 6,7-tetrahydroindenyl or "H₄Ind"), substituted versions thereof and heterocyclic versions thereof, for example.

Cp substituent groups may include hydrogen radicals, alkyls (e.g., methyl, ethyl, propyl, butyl, pentyl, hexyl, fluoromethyl, fluoroethyl, difluoroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkyls (e.g., cyclopentyl and cyclohexyl), aryls, alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbamoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In one embodiment, at least two substituent groups, two adjacent substituent groups in one embodiment, are joined to form a ring structure.

Each leaving group "A" is independently selected and may include any ionic leaving group, such as halogens (e.g., chloride and fluoride), hydrides, $C_1$ to $C_{12}$ alkyls (e.g., methyl, ethyl, propyl, phenyl, cyclobutyl, cyclohexyl, heptyl, tolyl, trifluoromethyl, methylphenyl, dimethylphenyl and trimethylphenyl), $C_2$ to $C_{12}$ alkenyls (e.g., $C_2$ to $C_6$ fluoroalkenyls), $C_6$ to $C_{12}$ aryls (e.g., $C_7$ to $C_{20}$ alkylaryls), $C_1$ to $C_{12}$ alkoxys (e.g., phenoxy, methyoxy, ethyoxy, propoxy and benzoxy), $C_6$ to $C_{16}$ aryloxys, $C_7$ to $C_{18}$ alkylaryloxys and $C_1$ to $C_{12}$ heteroatom-containing hydrocarbons and substituted derivatives thereof, for example.

Other non-limiting examples of leaving groups include amines, phosphines, ethers, carboxylates (e.g., $C_1$ to $C_6$ alkylcarboxylates, $C_6$ to $C_{12}$ arylcarboxylates and $C_7$ to $C_{18}$ alkylarylcarboxylates), dienes, alkenes, hydrocarbon radicals having from 1 to 20 carbon atoms (e.g., pentafluorophenyl) and combinations thereof, for example. In one embodiment, two or more leaving groups form a part of a fused ring or ring system.

In a specific embodiment, L and A may be bridged to one another to form a bridged metallocene catalyst. A bridged metallocene catalyst, for example, may be described by the general formula:

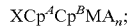

wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups "X" include divalent hydrocarbon groups containing at least one Group 13 to 16 atom, such as, but not limited to, at least one of a carbon, oxygen, nitrogen, silicon, aluminum, boron, germanium, tin and combinations thereof, wherein the heteroatom may also be a $C_1$ to $C_{12}$ alkyl or aryl group substituted to satisfy a neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$, $R_2Ge=$ or $RP=$ (wherein "=" represents two chemical bonds), where R is independently selected from hydrides, hydrocarbyls, halocarbyls, hydrocarbyl-substituted organometalloids, halocarbyl-substituted organometalloids, disubstituted boron atoms, disubstituted Group 15 atoms, substituted Group 16 atoms and halogen radicals, for example. In one embodiment, the bridged metallocene catalyst component has two or more bridging groups.

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis (trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic and include 4 to 10 ring members or 5 to 7 ring members, for example. The ring members may be selected from the elements mentioned above and/or from one or more of boron, carbon, silicon, germanium, nitrogen and oxygen, for example. Non-limiting examples of ring structures which may be present as or part of the bridging moiety are cyclobutylidene, cyclopentylidene, cyclohexylidene, cycloheptylidene, cyclooctylidene, for example. The cyclic bridging groups may be saturated or unsaturated and/or carry one or more substituents and/or be fused to one or more other ring structures. The one or more Cp groups which the above cyclic bridging moieties may optionally be fused to may be saturated or unsaturated. Moreover, these ring structures may themselves be fused, such as, for example, in the case of a naphthyl group.

In one embodiment, the metallocene catalyst includes CpFlu Type catalysts (e.g., a metallocene catalyst wherein the ligand includes a Cp fluorenyl ligand structure) represented by the following formula:

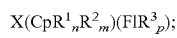

wherein Cp is a cyclopentadienyl group or derivatives thereof, Fl is a fluorenyl group, X is a structural bridge between Cp and Fl, $R^1$ is an optional substituent on the Cp, n is 1 or 2, $R^2$ is an optional substituent on the Cp bound to a carbon immediately adjacent to the ipso carbon, m is 1 or 2 and each $R^3$ is optional, may be the same or different and may be selected from $C_1$ to $C_{20}$ hydrocarbyls. In one embodiment, p is selected from 2 or 4. In one embodiment, at least one $R^3$ is substituted in either the 2 or 7 position on the fluorenyl group and at least one other $R^3$ being substituted at an opposed 2 or 7 position on the fluorenyl group.

In yet another aspect, the metallocene catalyst includes bridged mono-ligand metallocene compounds (e.g., mono cyclopentadienyl catalyst components). In this embodiment, the metallocene catalyst is a bridged "half-sandwich" metallocene catalyst. In yet another aspect of the invention, the at least one metallocene catalyst component is an unbridged "half sandwich" metallocene. (See, U.S. Pat. No. 6,069,213, U.S. Pat. No. 5,026,798, U.S. Pat. No. 5,703,187, U.S. Pat. No. 5,747,406, U.S. Pat. No. 5,026,798 and U.S. Pat. No. 6,069,213, which are incorporated by reference herein.)

Non-limiting examples of metallocene catalyst components consistent with the description herein include, for example cyclopentadienylzirconium$A_n$; indenylzirconium$A_n$; (1-methylindenyl)zirconium$A_n$; (2-methylindenyl)zirconium$A_n$, (1-propylindenyl)zirconium$A_n$; (2-propylindenyl)zirconium$A_n$; (1-butylindenyl)zirconium$A_n$; (2-butylindenyl)zirconium$A_n$; methylcyclopentadienylzirconium$A_n$; tetrahydroindenylzirconium$A_n$; pentamethylcyclopentadienylzirconium$A_n$; cyclopentadienylzirconium$A_n$; pentamethylcyclopentadienyltitanium$A_n$; tetramethylcyclopentyltitanium$A_n$; (1,2,4-trimethylcyclopentadienyl)zirconium$A_n$; dimethylsilyl(1,2,3,4-tetramethylcyclopentadienyl)(cyclopentadienyl)zirconium$A_n$; dimethylsilyl(1,2,3,4-tetramethylcyclopentadienyl)(1,2,3-trimethylcyclopentadienyl)zirconium$A_n$; dimethylsilyl(1,2,3,4-tetramethylcyclopentadienyl)(1,2-dimethylcyclopentadienyl)zirconium$A_n$; dimethylsilyl(1,2,3,4-tetramethylcyclopentadienyl)(2-methylcyclopentadienyl)zirconium$A_n$; dimethylsilylcyclopentadienylindenylzirconium$A_n$; dimethylsilyl(2-methylindenyl)(fluorenyl)zirconium$A_n$; diphenylsilyl(1,2,3,4-tetramethylcyclopentadienyl)(3-propylcyclopentadienyl)zirconium$A_n$; dimethylsilyl(1,2,3,4-tetramethylcyclopentadienyl) (3-t-butylcyclopentadienyl)zirconium$A_n$; dimethylgermyl(1,2-dimethylcyclopentadienyl)(3-isopropylcyclopentadienyl)zirconium$A_n$; dimethylsilyl(1,2,3,4-tetramethylcyclopentadienyl)(3-methylcyclopentadienyl)zirconium$A_n$; diphenylmethylidene(cyclopentadienyl)(9-fluorenyl)zirconium$A_n$; diphenylmethylidenecyclopentadienylindenylzirconium$A_n$; isopropylidenebiscyclopentadienylzirconium$A_n$; isopropylidene(cyclopentadienyl)(9-fluorenyl)zirconium$A_n$; isopropylidene(3-methylcyclopentadienyl)(9-fluorenyl)zirconium$A_n$; ethylenebis(9-fluorenyl)zirconium$A_n$; ethylenebis(1-indenyl)zirconium$A_n$; ethylenebis(1-indenyl)zirconium$A_n$; ethylenebis(2-methyl-1-indenyl)zirconium$A_n$; ethylenebis(2-methyl-4,5,6,7-tetrahydro-1-indenyl)zirconium$A_n$; ethylenebis(2-propyl-4,5,6,7-tetrahydro-1-indenyl)zirconium$A_n$; ethylenebis(2-isopropyl-4,5,6,7-tetrahydro-1-indenyl)zirconium$A_n$; ethylenebis(2-butyl-4,5,6,7-tetrahydro-1-indenyl)zirconium$A_n$; ethylenebis(2-isobutyl-4,5,6,7-tetrahydro-1-indenyl)zirconium$A_n$; dimethylsilyl(4,5,6,7-tetrahydro-1-indenyl)zirconium$A_n$; diphenyl(4,5,6,7-tetrahydro-1-indenyl)zirconium$A_n$; ethylenebis(4,5,6,7-tetrahydro-1-indenyl)zirconium$A_n$; dimethylsilylbis(cyclopentadienyl)zirconium$A_n$; dimethylsilylbis(9-fluorenyl)zirconium$A_n$; dimethylsilylbis(1-indenyl)zirconium$A_n$; dimethylsilylbis(2-methylindenyl)zirconium$A_n$; dimethylsilylbis(2-propylindenyl)zirconium$A_n$; dimethylsilylbis(2-butylindenyl)zirconium$A_n$; diphenylsilylbis(2-methylindenyl)zirconium$A_n$; diphenylsilylbis(2-propylindenyl)zirconium$A_n$; diphenylsilylbis(2-butylindenyl)zirconium$A_n$; dimethylgermylbis(2-methylindenyl)zirconium$A_n$; dimethylsilylbistetrahydroindenylzirconium$A_n$; dimethylsilylbistetramethylcyclopentadienylzirconium$A_n$; dimethylsily(cyclopentadienyl)(9-fluorenyl)zirconium$A_n$; diphenylsilyl(cyclopentadienyl)(9-fluorenyl)zirconium$A_n$; diphenylsilylbisindenylzirconium$A_n$; cyclotrimethylenesilyltetramethylcyclopentadienylcyclopentadienylzirconium$A_n$; cyclotetramethylenesilyltetramethylcyclopentadienylcyclopentadienylzirconium$A_n$; cyclotrimethylenesilyl(tetramethylcyclopentadienyl)(2-methylindenyl)zirconium$A_n$; cyclotrimethylenesilyl(tetramethylcyclopentadienyl)(3-methylcyclopentadienyl)zirconium$A_n$; cyclotrimethylenesilylbis(2-methylindenyl)zirconium$A_n$; cyclotrimethylenesilyl(tetramethylcyclopentadienyl)(2,3,5-trimethylclopentadienyl)zirconium$A_n$; cyclotrimethylenesilylbis(tetramethylcyclopentadienyl)zirconium$A_n$; dimethylsilyl(tetramethylcyclopentadieneyl)(N-tertbutylamido)titanium$A_n$; biscyclopentadienylchromium$A_n$; biscyclopentadienylzirconium$A_n$; bis(n-butylcyclopentadienyl)zirconium$A_n$; bis(n-dodecyclopentadienyl)zirconium$A_n$; bisethylcyclopentadienylzirconium$A_n$; bisisobutylcyclopentadienylzirconium$A_n$; bisisopropylcyclopentadienylzirconium$A_n$; bismethylcyclopentadienylzirconium$A_n$; bisoctylcyclopentadienylzirconium$A_n$; bis(n-pentylcyclopentadienyl)zirconium$A_n$; bis(n-propylcyclopentadienyl)zirconium$A_n$; bistrimethylsilylcyclopentadienylzirconium$A_n$; bis(1,3-bis(trimethylsilyl)cyclopentadienyl)zirconium$A_n$; bis(1-ethyl-2-methylcyclopentadienyl)zirconium$A_n$; bis(1-ethyl-3-methylcyclopentadienyl)zirconium$A_n$; bispentamethylcyclopentadienylzirconium$A_n$; bispentamethylcyclopentadienylzirconium$A_n$; bis(1-propyl-3-methylcyclopentadienyl)zirconium$A_n$; bis(1-n-butyl-3-methylcyclopentadienyl)zirconium$A_n$; bis(1-isobutyl-3-methylcyclopentadienyl)zirconium$A_n$; bis(1-propyl-3-butylcyclopentadienyl)zirconium$A_n$; bis(1,3-n-butylcyclopentadienyl)zirconium$A_n$; bis(4,7-dimethylindenyl)zirconium$A_n$; bisindenylzirconium$A_n$; bis(2-methylindenyl)zirconium$A_n$; cyclopentadienylindenylzirconium$A_n$; bis(n-propylcyclopentadienyl)hafnium$A_n$; bis(n-butylcyclopentadienyl)hafnium$A_n$; bis(n-pentylcyclopentadienyl)hafnium$A_n$; (n-propylcyclopentadienyl)(n-butylcyclopentadienyl)hafnium$A_n$; bis[(2-trimethylsilylethyl)cyclopentadienyl]hafnium$A_n$; bis(trimethylsilylcyclopentadienyl)hafnium$A_n$; bis(2-n-propylindenyl)hafnium$A_n$; bis(2-n-butylindenyl)hafnium$A_n$; dimethylsilylbis(n-propylcyclopentadienyl)hafnium$A_n$; dimethylsilylbis(n-butylcyclopentadienyl)hafnium$A_n$; bis(9-n-propylfluorenyl)hafnium$A_n$; bis(9-n-butylfluorenyl)hafnium$A_n$; (9-n-propylfluorenyl)(2-n-propylindenyl)hafnium$A_n$; bis(1-n-propyl-2-methylcyclopentadienyl)hafnium$A_n$; (n-propylcyclopentadienyl)(1-n-propyl-3-n-butylcyclopentadienyl)hafnium$A_n$; dimethylsilyltetramethylcyclopentadienylcyclopropylamidotitanium$A_n$; dimethylsilyltetramethyleyclopentadienylcyclobutylamidotitanium$A_n$; dimethylsilyltetramethyleyclopentadienylcyclopentylamidotitanium$A_n$; dimethylsilyltetramethylcyclopentadienylcyclohexylamnidotitanium$A_n$; dimethylsilyltetramethylcyclopentadienylcycloheptylamidotitanium$A_n$; dimethylsilyltetramethylcyclopentadienylcyclooctylamidotitanium$A_n$; dimethylsilyltetramethylcyclopentadienylcyclononylamidotitanium$A_n$; dimethylsilyltetramethylcyclopentadienylcyclodecylamidotitanium$A_n$; dimethylsilyltetramethylcyclopentadienylcycloundecylamidotitanium$A_n$; dimethylsilyltetramethylcyclopentadienylcyclododecylamidotitanium$A_n$; dimethylsilyltetramethylcyclopentadienyl(sec-butylamido)titanium$A_n$; dimethylsilyl(tetramethylcyclopentadienyl)(n-octylamido)titanium$A_n$; dimethylsilyl(tetramethylcyclopentadienyl)(n-decylamido)titanium$A_n$; dimethylsilyl(tetramethylcyclopentadienyl)(n-octadecylamido)titanium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; dimethylsilyl(2,4-dimethylcyclopentadienyl)(3',5'-dimethylcyclopentadienyl)zirconium$A_n$; dimethylsilyl(2,3,5-trimethylcyclopentadienyl)(2',4',5'-dimethylcyclopentadienyl)zirconium$A_n$; dimethylsilylbis(t-butylcyclopentadienyl)zirconium$A_n$; dimethylsilylbis(trimethylsilylcyclopentadienyl)zirconium$A_n$; dimethylsilylbis(2-trimethylsilyl-4-t-butylcyclopentadienyl)zirconium$A_n$; dimethylsilylbis(4,5,6,7-tetrahydroindenyl)zirconium$A_n$; dimethylsilylbis(indenyl)zirconium$A_n$; dimethylsilylbis(2-methylindenyl)zirconium$A_n$; dimethylsilylbis(2,4-dimethylindenyl)zirconium$A_n$; dimethylsilylbis(2,4,7-trimethylindenyl)zirconium$A_n$; dimethylsilylbis(2-methyl-4-phenylindenyl)zirconium$A_n$; dimethylsilylbis(2-ethyl-4-phenylindenyl)zirconium$A_n$; dimethylsilylbis(benz[e]indenyl)zirconium$A_n$; dimethylsilylbis(2-methylbenz[e]indenyl)zirconium$A_n$; dimethylsilylbis(benz[f]indenyl)zirconium$A_n$; dimethylsilylbis(2-methylbenz[f]indenyl)zirconium$A_n$; dimethylsilylbis(3-methylbenz[f]indenyl)zirconium$A_n$; dimethylsilylbis(cyclopenta[cd]indenyl)zirconium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; isopropylidene(cyclopentadienyl-3-methyl fluorenyl)zirconium$A_n$; isoropylidene(cyclopentadienyl-4-methylfluorenyl)zirconium$A_n$; isopropylidene(cyclopentadienyl-octahydrofluorenyl)zirconium$A_n$; isopropylidene(methylcyclopentadienyl-fluorenyl)zirconium$A_n$; isopropylidene(dimethyicyclopentadienylfluorenyl)zirconium$A_n$; isopropylidenc(tetramethylcyclopentadienylfluorenyl)zirconium$A_n$; diphenylmethylene(cyclopentadienyl-fluorenyl)zirconium$A_n$; diphenylmethylene(cyclopentadienyl-indenyl)zirconium$A_n$; diphenylmethylene(cyclopentadienyl-2,7-di-t-butylfluorenyl)zirconium$A_n$; diphenylmethylene(cyclopentadienyl-3-methylfluorenyl)zirconium$A_n$; diphenylmethylene(cyclopentadienyl-4-methylfluorenyl)zirconium$A_n$; diphenyimethylene(cyclopentadienyloctahydrofluorenyl)zirconium$A_n$; diphenylmethylene(methylcyclopentadienyl-fluorenyl)zirconium$A_n$; diphenylmethylene(dimethylcyclopentadienyl-fluorenyl)zirconium$A_n$; diphenylmethylene(tetramethylcyclopentadienyl-fluorenyl)zirconium$A_n$; cyclohexylidene(cyclopentadienyl-fluorenyl)zirconium$A_n$; cyclohexylidene(cyclopentadienylindenyl)zirconium$A_n$; cyclohexylidene(cyclopentadienyl-2,7-di-t-butylfluorenyl)zirconium$A_n$; cyclohexylidene(cyclopentadienyl-3-methylfluorenyl)zirconium$A_n$; cyclohexylidene(cyclopentadienyl-4-methylfluorenyl)zirconium$A_n$; cyclohexylidene(cyclopentadienyloctahydrofluorenyl)zirconium$A_n$; cyclohexylidene(methylcyclopentadienylfluorenyl)zirconium$A_n$; cyclohexylidene(dimethylcyclopentadienyl-fluorenyl)zirconium$A_n$; cyclohexylidene(tetramethylcyclopentadienylfluorenyl)zirconium$A_n$; dimethylsilyl(cyclopentadienyl-fluorenyl)zirconium$A_n$; dimethylsilyl(cyclopentadienyl-indenyl)zirconium$A_n$; dimethylsilyl(cyclopentdienyl-2,7-di-t-butylfluorenyl)zirconium$A_n$; dimethylsilyl(cyclopentadienyl-3-methylfluorenyl)zirconium$A_n$; dimethylsilyl(cyclopentadienyl-4-methylfluorenyl)zirconiun$A_n$; dimethylsilyl(cyclopentadienyl-octahydrofluorenyl)zirconium$A_n$; dimethylsilyl(methylcyclopentanedienyl-fluorenyl)zirconium$A_n$; dimethylsilyl(dimethylcyclopentadienylfluorenyl)zirconium$A_n$; dimethylsilyl(tetramethylcyclopentadienylfluorenyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; cyclohexylidene(cyclopentadienylfluorenyl)zirconium$A_n$; cyclohexylidene(cyclopentadienyl-2,7-di-t-butylfluorenyl)zirconium$A_n$; dimethylsilyl(cyclopentadienylfluorenyl)zirconium$A_n$; methylphenylsilyltetramethylcyclopentadienylcyclopropylamidotitanium$A_n$; methylphenylsilyltetramethylcyclopentadienylcyclobutylamidotitanium$A_n$; methytphenyisilyltetramethylcyclopentadienylcyclopentylamidotitanium$A_n$; methylphenyisilyltetramethylcyclopentadienylcyclohexylamidotitanium$A_n$; methylphenylsilyitetramethylcyclopentadienylcycloheptylamidotitanium$A_n$; methylplienyisilyltetramethylcyclopentadienylcyclooctylamidotitanium$A_n$; methylphenylsilyltetramethylcyclopentadienylcyclononylamidotitanium$A_n$; methylphenyisilyltetramethyleyclopentadienylcyclodecylamidotitanium$A_n$; methylphenylsilyltetramethylcyclopentadienylcycloundecylamidotitanium$A_n$; methylphenylsilyltetramethylcyclopentadienylcyclododecylamidotitanium$A_n$; methylphenylsilyl(tetramethylcyclopentadienyl)(sec-butylamido)titanium$A_n$; methylphenyisilyl(tetramethylcyclopentadienyl)(n-octylamido)titanium$A_n$; methylphenylsilyl(tetramethylcyclopentadienyl)(n-decylamido)titaniuim$A_n$; methylphenylsilyl(tetramethylcyclopentadienyl)(n-octadecylamido)titanium$A_n$; diphenylsilyltetramethylcyclopentadienylcyclopropylamidotitanium$A_n$; diphenylsilyltetramethylcyclopentadienylcyclobutylamidotitanium$A_n$; diphenylsilyltetramethylcyclopentadienylcyclopentylamidotitanium$A_n$; diphenylsilyltetramethylcyclopentadienylcyclohexylamidotitanium$A_n$; diphenylsilyltetramethylcyclopentadienylcycloheptylamidotitanium$A_n$; diphenyisilyltetramethylcyclopentadienylcyclooctylamidotitanium$A_n$; diphenylsilyltetramethylcyclopentadienylcyclononylamidotitaniun$A_n$; diphenyisilyltetramethylcyclopentadienylcyclodecylamidotitanium$A_n$; diphenyisilyltetramethylcyclopentadienylcycloundecylamnidotitaniumn$A_n$; diphenylsilyltetramethylcyclopentadienylcyclododecylamidotitanium$A_n$; diphenylsilyl(tetramethylcyclopentadienyl)(sec-butylamido)titanium$A_n$; diphenylsily(tetraniethylcyclopentadienyl)(n-octylamido)titanium$A_n$; diphenylsilyl(tetramethylcyclopentadienyl)(n-decylamido)titanium$A_n$; and diphenyisilyl(tetramethylcyclopentadienyl)(n-octadecylamido)titanium$A_n$.

The metallocene catalysts may be activated with a metallocene activator for subsequent polymerization. As used herein, the term "metallocene activator" is defined to be any compound or combination of compounds, supported or unsupported, which may activate a single-site catalyst compound (e.g., metallocenes, Group 15 containing catalysts, etc.) This may involve the abstraction of at least one leaving group (A group in the formulas/structures above, for example) from the metal center of the catalyst component. The metallocene catalysts are thus activated towards olefin polymerization using such activators.

Embodiments Of such activators include Lewis acids, such as cyclic or oligomeric polyhydrocarbylaluminum oxides, non-coordinating ionic activators (NCA), ionizing activators, stoichiometric activators, combinations thereof or any other compound that may convert a neutral metallocene catalyst component to a metallocene cation that is active with respect to olefin polymerization.

The Lewis acids may include alumoxane (e.g., "MAO"), modified alumoxane (e.g., "TIBAO") and alkylaluminum compounds, for example. Non-limiting examples of aluminum alkyl compounds may include trimethylaluminum, triethylaluminum, triisobutylaluminum, tri-n-hexylaluminum and tri-n-octylaluminum, for example.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., trisperfluorophenyl boron metalloid precursors), for example. The substituent groups may be independently selected from alkyls, alkenyls, halogen, substituted alkyls, aryls, arylhalides, alkoxy and halides, for example. In one embodiment, the three groups are independently selected from halogens, mono or multicyclic (including halosubstituted) aryls, alkyls, alkenyl compounds and mixtures thereof, for example. In another embodiment, the three groups are selected from $C_1$ to $C_{20}$ alkenyls, $C_1$ to $C_{20}$ alkyls, $C_1$ to $C_{20}$ alkoxys, $C_3$ to $C_{20}$ aryls and combinations thereof, for example. In yet another embodiment, the three groups are selected from the group highly halogenated $C_1$ to $C_4$ alkyls, highly halogenated phenyls, and highly halogenated naphthyls and mixtures thereof, for example. By "highly halogenated", it is meant that at least 50% of the hydrogens are replaced by a halogen group selected from fluorine, chlorine and bromine.

Illustrative, not limiting examples of ionic ionizing activators include trialkyl-substituted ammonium salts (e.g., triethylammoniumtetraphenylborate, tripropylammoniumtetraphenylborate, tri(n-butyl)ammoniumtetraphenylborate, trimethylammoniumtetra(p-tolyl)borate, trimethylammoniumtetra(o-tolyl)borate, tributylammoniumtetra(pentafluorophenyl)borate, tripropylammoniumtetra(o,p-dimethylphenyl)borate, tributylammoniumtetra(m,m-dimethylphenyl)borate, tributylammoniumtetra(p-tri-fluoromethylphenyl)borate, tributylammoniumtetra(pentafluorophenyl)borate and tri(n-butyl)ammoniumtetra(o-tolyl)borate), N,N-dialkylanilinium salts (e.g., N,N-dimethylaniliniumtetraphenylborate, N,N-diethylaniliniumtetraphenylborate) and N,N-2,4,6-pentamethylaniliniumtetraphenylborate), dialkyl ammonium salts (e.g., diisopropylammoniumtetrapentafluorophenylborate and dicyclohexylammoniumtetraphenylborate), triaryl phosphonium salts (e.g., triphenylphosphoniumtetraphenylborate, trimethylphenylphosphoniumtetraphenylborate and tridimethylphenylphosphoniumtetraphenylborate) and their aluminum equivalents, for example.

In yet another embodiment, an alkylaluminum compound may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment, for example.

The heterocyclic compound for use as an activator with an alkylaluminum compound may be unsubstituted or substituted with one or a combination of substituent groups. Examples of suitable substituents include halogens, alkyls, alkenyls or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals or any combination thereof, for example.

Non-limiting examples of hydrocarbon substituents include methyl, ethyl, propyl, butyl, pentyl, hexyl, cyclopentyl, cyclohexyl, benzyl, phenyl, fluoromethyl, fluoroethyl, difluoroethyl, iodopropyl, bromohexyl or chlorobenzyl, for example.

Non-limiting examples of heterocyclic compounds utilized include substituted and unsubstituted pyrroles, imidazoles, pyrazoles, pyrrolines, pyrrolidines, purines, carbazoles, indoles, phenyl indoles, 2,5-dimethylpyrroles, 3-pentafluorophenylpyrrole, 4,5,6,7-tetrafluoroindole or 3,4-difluoropyrroles, for example.

Combinations of activators are also contemplated by the invention, for example, alumoxanes and ionizing activators in combinations. Other activators include aluminum/boron complexes, perchlorates, periodates and iodates including their hydrates, lithium (2,2'-bisphenyl-ditrimethylsilicate)-4T-HF and silylium salts in combination with a non-coordinating compatible anion, for example. In addition to the compounds listed above, methods of activation, such as using radiation and electro-chemical oxidation are also contemplated as activating methods for the purposes of enhancing the activity and/or productivity of a single-site catalyst compound, for example. (See, U.S. Pat. No. 5,849,852, U.S. Pat. No. 5,859,653, U.S. Pat. No. 5,869,723 and WO 98/32775.)

The catalyst may be activated in any manner known to one skilled in the art. For example, the catalyst and activator may be combined in molar ratios of activator to catalyst of from 1000:1 to 0.1:1, or from 500:1 to 1:1, or from about 100:1 to about 250:1, or from 150:1 to 1:1, or from 50:1 to 1:1, or from 10:1 to 0.5:1 or from 3:1 to 0.3:1, for example.

The activators may or may not be associated with or bound to a support, either in association with the catalyst (e.g., metallocene) or separate from the catalyst component, such as described by Gregory G. Heathy, *Heterogeneous Single-Site Catalysts for Olefin Polymerization* 100(4) CHEMICAL REVIEWS 1347-1374 (2000).

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin, for example.

Specific inorganic oxides include silica, alumina, magnesia, titania and zirconia, for example. The inorganic oxides used as support materials may have an average particle size of from 5 microns to 600 microns or from 10 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2.5 cc/g, for example.

Methods for supporting metallocene catalysts are generally known in the art. (See, U.S. Pat. No. 5,643,847, which is incorporated by reference herein.)

Optionally, the support material, the catalyst component, the catalyst system or combinations thereof, may be contacted with one or more scavenging compounds prior to or during polymerization. The term "scavenging compounds" is meant to include those compounds effective for removing impurities (e.g., polar impurities) from the subsequent polymerization reaction environment. Impurities may be inadvertently introduced with any of the polymerization reaction components, particularly with solvent, monomer and catalyst feed, and adversely affect catalyst activity and stability. Such impurities may result in decreasing, or even elimination, of catalytic activity, for example. The polar impurities or catalyst poisons may include water, oxygen and metal impurities, for example.

The scavenging compound may include an excess of the aluminum containing compounds described above, or may be additional known organometallic compounds, such as Group 13 organometallic compounds. For example, the scavenging compounds may include triethyl aluminum (TMA), triisobutyl aluminum (TIBAl), methylalumoxane (MAO), isobutyl aluminoxane and tri-n-octyl aluminum. In one specific embodiment, the scavenging compound is TIBAl.

In one embodiment, the amount of scavenging compound is minimized during polymerization to that amount effective to enhance activity and avoided altogether if the feeds and polymerization medium may be sufficiently free of impurities.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (see, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

For example, the additives may include antistatic agents, slip agents, clarifiers, nucleators, hindered amine light stabilizers or combinations thereof. The antistatic agents may include glyceryl monostearate (GMS), for example. The slip agents may include calcium stearate, zinc stearate, ethylene bis-stearamide (EBS), oleamides and combinations thereof, for example.

In one or more embodiments, the concentration of slip agent is minimized. For example, the concentration of slip agent may be less than about 100 ppm, or less than about 50 ppm or less than about 25 ppm, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include propylene based polymers. As used herein, the term "propylene based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

The propylene based polymers may have a molecular weight distribution ($M_n/M_w$) of from about 1.5 to about 20, or from about 2 to about 12, for example.

In one or more embodiments, the propylene based polymers may have a narrow molecular weight distribution ($M_w/M_n$). As used herein, the term "narrow molecular weight distribution" refers to a polymer having a molecular weight distribution of from about 1.5 to about 8, or from about 2.0 to about 7.5 or from about 2.0 to about 7.0, for example.

The propylene based polymers may have a melting point ($T_m$) (as measured by DSC) of at least about 110° C., or from about 115° C. to about 175° C., for example.

The propylene based polymers may include about 15 wt. % or less, or about 12 wt. % or less 12, or about 10 wt. % or less, or about 6 wt. % or less, or about 5 wt. % or less or about 4 wt. % or less of xylene soluble material, for example (as measured by ASTM D5492-06).

The propylene based polymers may have a melt flow rate (MFR) (as measured by ASTM D-1238) of from about 0.01 dg/min to about 1000 dg/min., or from about 0.01 dg/min. to about 100 dg/min., or of at least about 10 dg/min. or from about 15 dg/min. to about 50 dg/min., for example.

In one or more embodiments, the polymers include polypropylene homopolymers. Unless otherwise specified, the term "polypropylene homopolymer refers to propylene homopolymers or those polymers composed primarily of propylene and limited amounts of other comonomers, such as ethylene, wherein the comonomer make up less than about 0.5 wt. % or less than about 0.1 wt. % by weight of polymer, for example.

In one or more embodiments, the polymers include propylene based random copolymers. Unless otherwise specified, the term "propylene based random copolymer" refers to those copolymers composed primarily of propylene and an amount of other comonomers, wherein the comonomers form at least about 0.5 wt. %, or at least about 0.8 wt. %, or at least about 2 wt. % or from about 0.5 wt. % to about 5.0 wt. % comonomer relative to the total weight of polymer, for example. In one or more embodiments, the comonomer content relative to the total weight of polymer is less than about 5.0 wt. %, or less than about 4.0 wt. %, or less than about 3.0 wt. % or less than about 2.5 wt. %, for example.

The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

In one or more embodiments, the propylene based polymer is formed from a metallocene catalyst.

Product Application

The polymers and blends thereof are useful in applications known to one skilled in the art, such as forming operations (e.g., film, sheet, pipe and fiber extrusion and co-extrusion as well as blow molding, injection molding and rotary molding).

Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multilayered constructions in the form of bottles, tanks, large hollow articles, rigid food containers and toys, for example.

In one or more embodiments, the polymers are utilized in melt processing applications. For example, the polymers may be utilized to form molded articles, such as blow molded articles or injection molded articles.

Melt processing applications generally require processing of a melted polymer at high temperatures (e.g., temperatures higher than the melting temperature of the polymer). For example, the melt processing applications may include processing temperatures of at least about 110° C., or at least about 120° C., or at least about 140° C. or from about 140° C. to about 300° C. In addition, melt processed articles, such as those utilized for food or medical applications may require subsequent heat treatment. For example, medical and/or food applications may require steam sterilization.

Unfortunately, plate-out and bloom (as described above) are commonly experienced when melt processing a variety of polymers. In particular, plate-out and bloom occur frequently when processing polymers at elevated temperatures for extended periods of operation, such as those utilized in commercial operation.

However, embodiments of the invention unexpectedly provide for commercially viable operation with minimal to no plate-out or blooming (as measured by visual inspection). In particular, it has unexpectedly been observed that the embodiments described herein (e.g., metallocene polypropylene, less than 5 wt. % ethylene, less than 5 wt. % xylene solubles, low comonomer incorporation or combinations thereof) provide for commercially viable operation under conditions identical to those utilizing Ziegler-Natta polypropylene experiencing plate-out and/or bloom. For example, the embodiments described herein are capable of providing for melt processing operations that are significantly longer than identical operations absent the embodiments of the invention. In one or more embodiments, which operated at aggressive conditions (high barrel (e.g., at least 420° F.) and hot runner temperature (e.g., at least 480° F.)) intended to induce plate-out, the operations utilizing embodiments of the invention are unexpectedly capable of operation of at least about 20 hours, or at least about 25 hours, or at least about 30 hours, or at least about 35 hours or at least about 40 hours without observed plate-out or bloom. However, operations at commercial conditions utilizing embodiments of the invention are unexpectedly capable of operation of at least about 100 hours, or at least about 150 hours, or at least about 200 hours or at least about 250 hours without observed plate-out or bloom.

In one or more embodiment, the articles are utilized for medical or food applications, for example, which may require subsequent heat treatment, such as sterilization, for suitability in its intended application. For example, subsequent heat treatment may include heating the articles at a temperature of at least about 120° C. for a time of at least about 30 mins.

Embodiments of the invention further and unexpectedly provide for significant reduction in haze upon subsequent heat treating. For example, the haze of the article may be reduced by at least about 20%, or at least about 30%, or at least about 50%, or at least about 80%, or at least about 100%, or at least about 150% or at least about 200% compared to articles absent the heat treatment, for example.

EXAMPLES

Sample A was formed from Polymer A, which is a propylene based random copolymer formed from a Ziegler-Natta catalyst having 3.2 wt. % ethylene and a melt flow rate of 10 dg/min., commercially available as P5M4K-046 from Huntsman Chemical.

Sample B was formed from Polymer B, which is a propylene based random copolymer formed from a Ziegler-Natta catalyst having 2.2 wt. % ethylene and a melt flow rate of 10 dg/min., commercially available as 7525MZ from TOTAL Petrochemicals USA, Inc.

Sample C was formed from Polymer C, which is a propylene based random copolymer formed from a metallocene catalyst having 1.5 wt. % to 2.5 wt. % ethylene and having a melt flow rate of 30 dg/min., commercially available as M6823MZ from TOTAL Petrochemicals USA, Inc.

Sample D was formed from Polymer D, which is a propylene based random copolymer formed from a metallocene catalyst having 2.2 wt. % ethylene having a melt flow rate of 32 dg/min. and commercially available as 6823MZ from TOTAL Petrochemicals USA, Inc.

Sample E was formed from Polymer E, which is a propylene based random copolymer formed from a Ziegler-Natta catalyst having 2.7 wt. % ethylene and having a melt flow rate of 30 dg/min.

Example 1

Polymer articles were formed by injection molding polymer samples to form caps.

Sample A was run at a hot runner temperature of 450° F. and a barrel temperature profile of 400/420/420/450° F. on day 1, hot runner temperature of 480° F. on days 2-5 and barrel temperature profile of 420/440/440/470° F. on day 2, 430/450/450/480° F. on day 3, 440/460/460/490° F. on days 4-5. Plate-out began on day 4 and turned significantly severe (enough plate out to cease operation) on day 5.

Sample B was run at a hot runner temperature of 480° F. and a barrel temperature profile of 440/460/460/490° F. for 5 days. Plate-out began on day 4 and turned significantly severe (enough plate out to cease operation) on day 5.

Sample C was run at a hot runner temperature of 480° F. and a barrel temperature profile of 440/460/460/490° F. for 5 days. No plate-out was observed.

Sample D was run at a hot runner temperature of 480° F. and a barrel temperature profile of 440/460/460/490° F. for 5 days. No plate-out was observed.

It was observed that Samples C and D exhibited significantly longer operation times than Samples A and B with no plate-out observed.

Example 2

Polymer articles were heat treated at 120° C. for 30 minutes and properties of the article were then measured. The properties of the heat treated articles and non-heat treated articles (labeled as control) follow in Table 1.

TABLE 1

| Sample | Haze (0.02" thickness) | Haze (0.04" thickness) | Haze (0.06" thickness) | Haze (0.08" thickness) |
|---|---|---|---|---|
| C (control) | 4.88 | 9.23 | 15.7 | 19.1 |
| C | 4.24 | 8.75 | 15.4 | 18.7 |
| E (control) | 7.99 | 19.7 | 32.5 | 43.8 |
| E | 28.6 | 35.8 | 43.9 | 53.6 |

*haze is measured by ASTM D-1003

It was observed that Sample C exhibited much less increase in haze (actually a decrease in haze) upon heating compared to Sample E (which exhibited at least 20% increase and as much as 250%).

While the foregoing is directed to embodiments of the present invention, other and further embodiments of the invention may be devised without departing from the basic scope thereof and the scope thereof is determined by the claims that follow.

What is claimed is:

1. A process of forming injection molded polymer articles comprising:
operating an injection molding process at a barrel temperature of at least 420° F. and a hot runner temperature of at least 480° F. for at least 30 hours without experiencing plate-out or blooming in injection molded polymer articles formed in the injection molding process, wherein operating the injection molding process comprises melt processing a propylene based polymer by injection molding at the barrel temperature of at least 420° F. and the hot runner temperature of at least 480° F. to form the injection molded polymer articles, wherein the propylene based polymer is formed from a metallocene catalyst and has an ethylene content of less than 5 weight percent and less than 5 weight percent of xylene solubles.

2. The process of claim 1, further comprising sterilizing the injection molded polymer articles at a temperature of at least about 120° C. for a time of at least about 30 minutes.

3. The process of claim 1, wherein the injection molding process is operated at the barrel temperature of at least 420° F. and the hot runner temperature of at least 480° F. for at least 100 hours without experiencing plate-out or blooming in the injection molded polymer articles formed in the injection molding process.

4. The process of claim 1, wherein the injection molding process is operated at the barrel temperature of at least 420° F. and the hot runner temperature of at least 480° F. for at least 250 hours without experiencing plate-out or blooming in the injection molded polymer articles formed in the injection molding process.

5. The process of claim 1, further comprising contacting the propylene based polymer with an additive selected from the group consisting of: antistatic agents, slip agents, clarifiers, nucleators, hindered amine light stabilizers and combinations thereof.

6. The process of claim 5, wherein the propylene based polymer is contacted with less than about 100 ppm of the slip agents.

7. The process of claim 1, wherein the propylene based polymer exhibits a molecular weight distribution of from about 1.5 to about 12.

8. The process of claim 1, wherein the propylene based polymer exhibits a molecular weight distribution of from about 1.5 to about 8.

9. The process of claim 8, wherein the molecular weight distribution is attained without the use of peroxides.

10. The process of claim 1, wherein the propylene based polymer exhibits a melt flow rate of from about 15 dg/min. to about 100 dg/min.

11. The process of claim 1, wherein the propylene based polymer exhibits a melt flow rate of from about 15 dg/min. to about 50 dg/min.

12. The process of claim 1, wherein the propylene based polymer is formed with low co-monomer incorporation.

13. The process of claim 1, wherein the melt processing occurs at a temperature of at least about 110° C.

14. A molded polymer article formed from the process of claim 1, wherein the propylene based polymer exhibits a melt flow rate of at least about 10 dg/min and wherein the propylene based polymer is a polypropylene homopolymer; or a propylene based random copolymer that comprises comonomers selected from the group consisting of: 1-butene, 1-pentene, 1-hexene, 1-heptene, 1-octene, 1-nonene, 1-decene, 4-methyl-1-pentene, and combinations thereof.

15. The molded polymer article of claim 14, wherein the molded polymer article is for use in medical or food applications.

16. The process of claim 1, wherein the propylene based polymer is a random copolymer of propylene and ethylene.

17. The process of claim 1, wherein the propylene based polymer is a polypropylene homopolymer.

* * * * *